United States Patent [19]

Ehlenz et al.

[11] Patent Number: 4,517,308

[45] Date of Patent: May 14, 1985

[54] METHOD OF PRODUCING A SORPTIVE BODY, PARTICULARLY FOR ELIMINATING ODORS, AIR FRESHENING, ETC. AND THE RESULTANT PRODUCT

[75] Inventors: Peter Ehlenz, Königswinter; Lutz Irgel, St. Augustin, both of Fed. Rep. of Germany

[73] Assignee: Collo GmbH, Bornheim-Hersel, Fed. Rep. of Germany

[21] Appl. No.: 413,310

[22] Filed: Aug. 31, 1982

[30] Foreign Application Priority Data

Sep. 4, 1981 [DE] Fed. Rep. of Germany ....... 3135025

[51] Int. Cl.$^3$ ...................... B29D 27/00; B01J 20/10; B01J 20/20; B01J 20/30
[52] U.S. Cl. .................................. 502/401; 36/30 A; 36/43; 264/45.3; 264/46.4; 264/53; 264/DIG. 5; 264/DIG. 7; 264/DIG. 13; 428/316.6; 428/317.9; 502/402
[58] Field of Search ............ 264/53, DIG. 7, DIG. 5, 264/DIG. 13, 45.3, 46.4; 36/43, 30 A; 502/401, 402; 428/316.6, 317.9

[56] References Cited

U.S. PATENT DOCUMENTS

| | | | |
|---|---|---|---|
| 2,907,075 | 10/1959 | Newby | 264/53 X |
| 3,094,492 | 6/1963 | Miller et al. | 502/402 |
| 3,454,502 | 7/1969 | Hiltgen et al. | 502/401 |
| 3,813,347 | 5/1974 | Hayes | 502/402 |
| 4,051,098 | 9/1977 | Takemura et al. | 502/401 |
| 4,155,123 | 5/1979 | Popper | 36/43 X |
| 4,235,027 | 11/1980 | Singh | 428/317.9 X |

FOREIGN PATENT DOCUMENTS 2422574 11/1975 Fed. Rep. of Germany .

Primary Examiner—Philip Anderson
Attorney, Agent, or Firm—Pollock, Vande sande & Priddy

[57] ABSTRACT

The aim of the invention was to find a method of producing a sorptive body, to be used especially with objectives such as the elimination of odors and air freshening. In the invented process a granular or powdered solid component consisting of a sorptive material, e.g. active carbon, or a compound containing such a material, is mixed with a binding agent, by which it is generally fixed to a carrier substance. The essence of the invention is that at least part of the finely-ground solid component is mixed with a liquid sorbate; only then it is combined with the dissolved binding agent. In a subsequent operation heat is applied to the mixture, thereby expelling the sorbate. The heat causes pores and capillaries to form within the binding agent, thus enabling air to enter into the sorptive substances deposited in the binding agent and so effecting an increase in the active area of the surface of the body. The invented process can be applied to such products as filter mats, air fresheners, inner soles for shoes etc.

21 Claims, 3 Drawing Figures

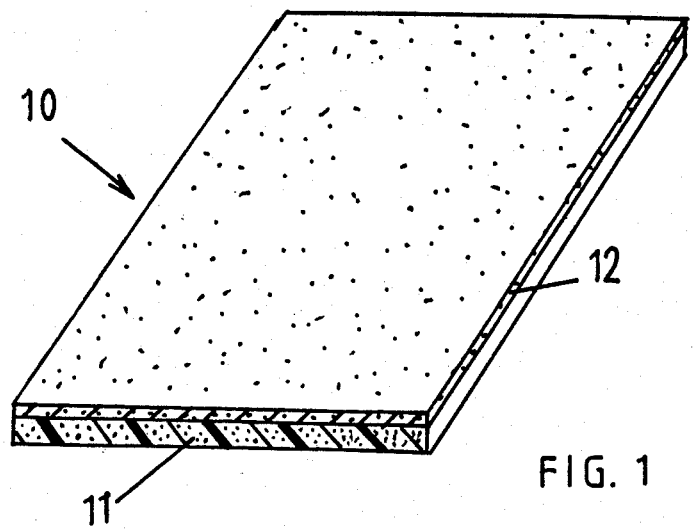
FIG. 1
FIG. 2
FIG. 3
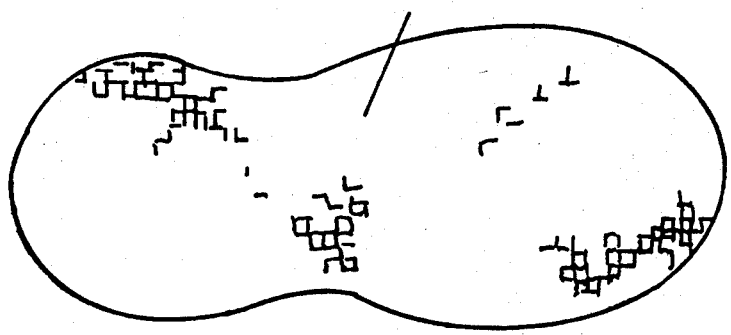

METHOD OF PRODUCING A SORPTIVE BODY, PARTICULARLY FOR ELIMINATING ODORS, AIR FRESHENING, ETC. AND THE RESULTANT PRODUCT

TECHNICAL FIELD

The invention relates to a method of producing a sorptive body for the elimination of odours, air freshening etc, whereby a finely-ground solid component consisting of a sorptive substance or containing such a substance in its compound is added to a binding agent by which it is fixed into a coherent whole. The invention is applicable to products whose main purpose is the elimination of smells and whose chief use is in kitchen extractor-hoods, air-conditioning devices etc. as a filter or as a static air purifier or fresh air dispenser or as inner soles for shoes.

BACKGROUND ART

For extractor hoods and other air-purifying devices granular filtering materials are used, particularly adsorptive materials—such as active carbon—or chemisorptive materials; these pourable substances are tipped into filter cassettes etc., which are placed in the path of the airflow so that the air which is to be filtered is made to pass through the porous filter cassette and to flow through the pourable filter material contained in them. Filtering materials are familiar which consist of a mixture of at least one acidic or basic chemisorptive substance and a moisture-storing substance reacting chemically to the entry of external gases and which can be poured (cf. DE-OS No. 24 22 547). This moisture-storing substance can be a water-soluble binding agent which binds the chemisorptive granular substance.

Filter cassettes which work with a pourable filtering material are relatively expensive to produce and have the further disadvantage that various shapes of filter cassette must be made available to fit the various types of extractor hood or other air-filtering devices, thus raising the cost of production and storage considerably.

Filters are also familiar in which sorptive materials are held in powder or granule form in a binding agent and are fixed into the desired form with the aid of the binding agent. These filters can be produced by using a mould or can have the form of filter discs and filter mats. However, the disadvantage here is that the granular sorptive substances are more or less surrounded by the binding agent, resulting in a considerable loss of potential sorptive capability.

DISCLOSURE OF THE INVENTION

The main aim of this invention is to so construct a method of the type outlined at the start of this paper in which sorptive finely-particled solids are bound by means of a binding agent that an increased sorptive capacity is obtained by means of a simple and cost-effective process. The invention is aimed at the manufacture of sorptive products, principally filter mats or discs or air purification filters.

The aim is achieved, following the invented method, by first joining part of the ground solid component to a liquid sorbate then by mixture with a liquid binding agent. Heat is then applied to the mixture, causing the expulsion of the sorbate. A particularly simple process, enabling highly effective products to be made, is achieved by adding the above-mentioned mixture to a carrier body either by coating or by impregnation before heat is applied.

The invented method involves the introduction of a liquid sorbate contained in an adsorbent or capillary-active component to the mixture of binding agent and sorptive substance plus, if required, other agents, the sorbate being subsequently expelled by heat treatment. Thus the binding agent will open, that is to say capillaries and pores are formed in it, with the result that the active surface of the sorptive substance held by the binding agent is virtually freed for the entry of air, so increasing the active surface area; the sorptive materials, having been fixed by the binding agent or when they have been stuck to the carrier can therefore almost regain their full sorptive capacitiy by making use of their thermal desorption. The time taken to eject the sorbate will clearly be shorter if heat is applied at a temperature substantially higher than the boiling point of the sorbate. A temperature difference of 20°–40° C. is usually sufficient, though shorter treatment time and more extensive capillary fissures in the binding agent can be attained through higher temperature differences.

As a carrier body for the mixture the usual materials such as synthetic foam, fleecy materials, woven or spun fabrics, paper or cardboard can be used. Porous carriers, such as fibrous fleeces and foam mats are particularly well suited to this purpose. Familiar materials can also be used as means of sorption. Active carbon is particularly good, though other adsorbent powdered or granular substances, notably silica gel, a molecular sieve, bentonite, perlite, pumice stone, infusorial earth, may be used. It is possible to replace or complement the adsorbent materials with chemisorptive granular materials; such chemisorptive substances are familiar, for instance, from the abovementioned DE-OS No. 24 22 · 574 of the applicant.

For the sorbate which is expelled from the mixture, liquids with a boiling point not higher than 100° C. are suitable; hydrocarbons, especially alcohol, chlorinated or fluorized hydrocarbons, ester, ethyl or methyl acetate, are best. As a sorbate the solvent of the binding agent or adhesive, especially ethyl acetate, can be used to advantage. For the binding agent itself, the familiar non-water-soluble synthetic adhesives are most suitable, particularly polyurethane adhesives.

To achieve an extensive connected open system of capillaries and pores when expelling the sorbate, the part of the sorbate to be expelled should be not too small. Preferably an amount of the sorbate is added to the compound consisting of sorptive substance which is at least equal to the amount of the sorptive substance in the finely-ground solid compound.

In the heated mixture of the sorptive body, the weight of the binding agent should not exceed 30% of the weight of the sorptive substance in the finely-ground compound, and should be preferably 5–15% of the weight of the latter. Additionally in the heated mixture of the sorptive body there should be an amount of sorptive substances at least equal in weight to the part of the carrier substance.

In addition to the sorbate to be expelled at least one active substance, preferably in liquid form, can be added to the mixture to fulfil a specific function in the end product. The invented method may be applied in such a way that part of the finely-particled solid component can be impregnated with a low-boiling sorbate and another part of the solid component impregnated with at least one relatively higher-boiling sorbate; after addition of the binding agent the parts of the solid component are subjected to heat at a temperature between the boiling points of the two sorbates. The first sorbate, with the lower boiling point, is expelled and capillaries form in the binding agent, while the second, higher-boiling sorbate is retained as an active ingredient and is set free during use. For the higher-boiling sorbate an aromatic substance, especially perfume oil but also menthol, camphor etc., or solutions of a scent or active substance in a solvent with a higher boiling point may be used, lending the product a particular aroma, which is released gradually over long periods of use. Such products can be employed as fresh-air dispensers for scenting rooms, cupboards, etc. The added perfumed substance is also advantageous when the product is used as a filter mat in kitchen extractor-hoods, air conditioning devices etc. because in this case the filter mat not only eliminates but also covers up odours. The various sorbates can also be taken up into the same finely-ground solid, especially active carbon. Furthermore, the mixture can contain various powdered or fine-grain solids, in which case one solid component takes in the lower-boiling sorbate which is to be expelled while the other solid component takes in the higher-boiling active sorbate. The active sorbate can for example be contained effectively in a hollow-particled distended or foamed material, particularly perlite. A tenside or similar substance can be added to the higher-boiling sorbate to trap the sorbate and ensure its gradual, measured release over a longer period of time.

The invented method is particularly applicable to the production of odour-filters in kitchen extractor-hoods, air conditioners and other air-filtering devices; it can also be used in the production of air fresheners, in which the odours present in the air can be trapped by adsorption or chemisorption while at the same time a pleasant active aromatic component is constantly released into the air, thus overcoming the remaining odours in the atmosphere.

There follow descriptions of how the invented method may be implemented and examples of the manufacture of products according to the method. (Quantities are given in % weights).

EXAMPLE 1

A mixture of the following substances is produced:

| | |
|---|---|
| Active carbon (powdered < 0.1 mm (0.004 in) as a means of sorption) | 300 |
| Ethyl acetate (boiling point 75–77° C.) as a sorbate | 500 |
| Polyurethane adhesive in the form of a polyester polyol with 1.7–2.0% hydroxyl content, 10% dissolved in ethylacetate | 500 |
| Hardener for polyurethane adhesive, i.e. polyisocyanate, 75% dissolved in the ethyl acetate | 50 |

The powdered active carbon is mixed into the ethyl acetate sorbate. The active carbon soaks in the ethyl acetate to saturation, thus expelling the air from the capillaries of the active carbon. The sorbate-impregnated active carbon is then stirred into the polyurethane adhesive mixed with the hardener. A carrier is coated on one or both sides with the resulting mixture. This can be done with the aid of a gluing machine or the carrier can be drawn through the mixture, the coated carrier being squeezed out between two rollers.

As carrier a fibrous fleece is used, for instance a stiff fleece with a weight of 300 g per m$^2$ (0.98 oz per ft$^2$), as well as a thickness of 15 mm (0.59 ins). The weight of the coating is some 5 kg/m$^2$ (1.02 lbs per ft$^2$). The carrying body coated with the mixture is then dried out in a drying room or a drying channel either for about an hour at 80°–100° C. or for about 10 minutes at 120°–150° C. In this final heat treatment the sorbate (ethyl acetate) stored in the active carbon is expelled while the solvent (also ethyl acetate) of the polyurethane adhesive will evaporate as the latter hardens. The result is a coated mat or disc-shaped product, in which the active carbon is embodied in the layer of adhesive, very capillarous and porous as a result of the heat treatment and the expulsion of the sorbate. The active carbon filter so produced can be used as a filter insert in kitchen steam filters or air-conditioning devices and can be cut into the desired shape.

EXAMPLE 2

Example 1 is altered as follows: instead of the fleece an open-cell, flexible polyurethane foam mat with a volume weight of 30–35 kg/m$^3$ (1.87 to 2.18 lbs per ft$^3$), a thickness of 15 mm (0.59 ins) and a pore density of some 15–20 ppi is coated with the mixture. After the heat treatment a filter mat is produced which can be used as an active carbon filter in kitchen extractor-hoods, air-conditioning devices etc.

EXAMPLE 3

A mixture of the following three components A, B and C is produced:

| | |
|---|---|
| Component A: | |
| Active carbon (as a sorptive substance; cf. example 1) | 300 |
| Fluorocarbons (as the sorbate to be expelled; boiling point is about 22° C.) | 300 |
| Component B: | |
| Polyurethane adhesive (as in example 1) | 500 |
| Hardener (as in example 1) | 50 |
| Component C: | |
| Finely-ground active carbon (grain size 0.1 to 0.5 mm (0.004 to 0.02 ins)) | 100 |
| perfume oil (e.g. lemon) | 50 |
| Nonylphenol-polyglycol ether (tenside used to provide cohesion) | 50 |

In Component C the nonylphenol-polyglycol ether has the task of delaying the release of the scent (Perfume oil) during use so that the product releases its aromatic component over a long period of time. This wax-like tenside is mixed with the perfume oil and melted by heating to about 50°–60° C., at which point the active carbon is stirred into the melted liquid. Component C, which is thus produced, is then mixed, along with component A, into the adhesive (component B). The resulting mixture can then be put onto a stiff fleece, as in example 1, or onto a strip of foam, as in example 2. Heat is then applied as per example 1 to expel the sorbate flurocarbon at a temperature at least 20° C. above the boiling point of flurocarbon.

The result is a coated carrier strip, which can likewise be used to advantage as an active-carbon filter in kitchen extractor-hoods, air-conditioning devices etc. and in which the active carbon serves to eliminate cooking and atmospheric odours by adsorption, while the aromatic agent serves to scent the room or to cover up unpleasant smells. This active-carbon filter consequently has the effect of fresh-air dispenser.

EXAMPLE 4

A mixture is produced from the following components:

| | |
|---|---|
| Component A: | |
| Active carbon (as in Example 1) | 250 |
| Petrol (gasoline boiling at 40–60° C.) as the expendable sorbate | 250 |
| Component B: | |
| Polyurethane adhesive (as in Example 1) | 500 |
| Hardener for polyurethane adhesive (as in example 1) | 50 |
| Component C: | |
| Active carbon (ground to grain size 0.1–0.5 mm) | 250 |
| Perfume oil (e.g. oil of lavender) | 125 |
| Polyethylene glycol (molecular weight 20000) to produce cohesion | 125 |

The polyethylene glycol in component C has the same function as the nonylphenol-polyglycol ether in example 3. It has the consistency of a hard wax and is brought to its melting temperature of 50°–60° C. and mixed with the other ingredients of component C before being mixed with components A and B.

The mixture produced in this way is spread onto the surface of an open-cell polyurethane foam some 20 mm (0.8 in) thick. Then heat is applied to expel the sorbate (petrol) at a temperature of 80°–100° C. The finished product is particularly suitable for use as an air freshener and as a fresh-air dispenser in wardrobes, linen cupboards etc.

EXAMPLE 5

A mixture is produced from the following components A, B and C:

| | |
|---|---|
| Component A: | |
| Pulverized active carbon (as in example 1) | 250 |
| Ethyl acetate (as in Example 1) | 250 |
| Component B: | |
| Polyurethane adhesive (as in example 1) | 500 |
| Hardener (as in Example 1) | 50 |
| Component C: | |
| Perfume oil (e.g. mountain pine) | 125 |
| Polyethylene glycol (as in example 4) | 125 |
| Active carbon (as in example 4) | 250 |

Components A, B and C are, as illustrated in connection with examples 3 and 4 above, produced and processed into a mixture. A spunbonded polyester fleece with a weight of some 250–300 g/m² (0.761–0.913 oz/ft²) is coated to a thickness of 2 mm (0.08 in) with the mixture, then heat is applied to a temperature of 100° C. The flat, coated material so produced can then be cut to the required dimensions.

The product outlined in this example is particularly suited as an inner sole for shoes, which on the one hand consumes perspiration odours by adsorption and on the other hand covers up odours to a certain degree over a long period of wear.

EXAMPLE 6

With the mixture outlined in example 5 an open-cell flexible polyurethane foam with a volume weight of abour 25–30 kg per m³ (1.56–1.87 lbs per ft³), a pore density of about 30 ppi and a strip thickness of some 5 mm (0.2 in). After the application of heat the coated foam strip is cut to the required dimensions.

This product is also eminently suitable for use as an inner sole.

EXAMPLE 7

A mixture is produced from components A, B and C as follows:

| | |
|---|---|
| Component A: | |
| Active carbon (as in example 1) | 250 |
| Ethyl acetate (as in example 1) | 250 |
| Component B: | |
| Polyurethane adhesive (as in example 1) | 500 |
| Hardener for polyurethane adhesive (as in example 1) | 50 |
| Component C: | |
| Active carbon (less than 2 mm (0.08 in) | 250 |
| Perfume oil (resistant to quaternary ammonium compounds) | 125 |
| Alkyldimethyl ammonium chloride | 25 |
| Nonylphenol-polyglycol ether | 125 |

In Component C the alkyldimethyl ammonium chloride serves to combat athlete's foot. The mixture is produced in the way described and is then used to impregnate or coat a fibrous fleece, such as that used in example 5. Heat is applied as per example 5.

The end product is likewise suitable for use as the inner sole of a shoe.

EXAMPLE 8

A mixture of components A, B and C is produced as outlined in example 7 and is spread onto a foam strip as in example 6. The end product is also particularly well suited to adaptation as an inner sole and is effective against athlete's foot.

EXAMPLE 9

A mixture of components A, B and C is produced as follows:

| | |
|---|---|
| Component A: | |
| Active carbon (as in example 1) | 100 |
| Ethyl acetate | 100 |
| Component B: | |
| Polyurethane adhesive (as in example 1) | 500 |
| Hardener for polyurethane adhesive (as in example 1) | 50 |
| Component C: | |
| Finely-ground perlite material (below 0.5 mm (0.02 in)) | 100 |
| Nonylphenol-polyglycol ether | 100 |
| Perfume oil | 300 |

The mixture is produced in the way described. The perlite material consists of a finely chopped, hollow-bodied mineral substance which takes the mixture of perfume oil and nonylphenyl-polyglycol ether into its fine hollow particles. A material such as polyurethane foam, open-celled with a pore density of 10–15 ppi, is coated on one or both sides with the mixture, then heat is applied to a temperature of 100°–120° C. The resulting product is particularly suitable for use as an air freshener.

EXAMPLE 10

A mixture is produced of the following components A, B and C:

| Component A: | |
|---|---|
| Active carbon (as in example 1) | 300 |
| Ethyl acetate | 300 |
| Component B: | |
| Polyurethane adhesive (as in example 1) | 500 |
| Hardener for polyurethane adhesive (as in example 1) | 25 |
| Component C: | |
| Active carbon (pulverised to below 0.3 mm (0.012 in) | 50 |
| Perfume oil (e.g. lemon) | 25 |
| Polyethylene glycol (molecular weight 20000) | 25 |

The mixture is produced in the way already described and is used to coat a foam strip made of open-cell polyurethane foam with a porosity of about 10–15 ppi. After the application of heat the foam strip is cut into the desired shape. The product is particularly suitable as a stay-fresh device or a fresh-air dispenser in refrigerators or kitchen cupboards.

With the aid of the invented method products can be manufactured which have outstanding adsorbency while at the same time emitting active substances at a very steady rate during use. Active ingredients which may best be utilized are etherial oils (perfume) and other substances which fit the purpose of a particular product. In all cases the temperature for heat treatment is lower than the boiling point of the higher-boiling active ingredient. The familiar polyurethane adhesives are preferred as binding agents although dispersion fixatives, casein and the conventional glues may also be used. For the adsorbate which is expelled by the heat treatment hydrocarbons are preferred, especially flurocarbons, alcohols (methyl, ethyl and propyl alcohols etc.) ester, methyl acetate, ethyl acetate, ketone, acetone, chlorinated hydrocarbons, i.e. ethylene and methylene chloride, although in certain circumstances water can be used. In the final product the proportion of the sorbent material—generally active carbon—should be at least equal to the proportional weight of the carrier body, while the binding agent's weight should not be more than 30% that of the sorptive substance and preferably only 5–15%. The amount of active material (generally perfume) can be varied to suit requirements and may even saturate the sorptive material.

As has been indicated in the various examples, the sorbate is mostly spread onto the carrier but can also be taken up by impregnation. It is, however, also possible to process the mixture without the use of a carrier. Here the pourable mixture is tipped into e.g. a mould and subjected within the mould to the heat treatment. During this heating the binding agent sets and the sorbate while becoming expelled opens capillary fissures in the setting binding agent enclosing the finely-ground solid component consisting of sorptive material. Heat treatment can also be carried out after the binding agent has set.

BRIEF DESCRIPTION OF THE DRAWINGS

In the following sketches various possible designs for the invented product are shown diagrammatically.

FIG. 1 represents in diagrammatic form a filter mat (10) consisting of a thin coated foam mat (11) made of open-cell plyurethane foam. The thickness of the foam mat (11) can be taken as 10–20 mm (0.4–0.8 in). The foam mat contains at least one coating (12), which is thinner than the foam strip (11) and could be 1–4 mm (0.04–0.16 in). The coating (12) is produced as outlined in the above examples, as in for instance examples 2, 4, 9 or 10. A Mat of this type may be cut into any desired shape according to its intended use. The means of sorption (usually active carbon) is fixed to the foam strip by means of the adhesive, so that it will not crumble off when the mat is cut.

FIG. 2 shows the side view of a product of the invented method, consisting of a fibrous fleece (14) impregnated with the mixture and produced according to, say, example 5. The fibrous fleece (14) could be 2 mm thick (0.08 in). After heat treatment it can be cut into the shape of an inner sole (15) as in FIG. 3. When the invented product is used as a filter mat in kitchen extractor-hoods or air-conditioning devices, the requirement for air to keep circulating means that the finished product must demonstrate sufficient permeability; this is ensured by the relatively small proportion of binding agent in the mixture which has been spread onto, or impregnated into, the mat.

BEST MODE FOR CARRYING OUT THE INVENTION

The best mode of carrying out the inventive method is principally shown in example 3, in which a mixture of the three components A, B and C is produced. In component C nonylphenol-polyglycol is added that has in comparison to examples 1 and 2 the additional task of delaying the release of a scent during use of the body produced according to this example. The successive method steps of this prefered method are explained above in detail.

In the method according to example 4 there is used instead of the tenside of example 3 (nonyphenol-polyglycol ether) the tenside polyethyleneglycol. The product of this process is also eminently suitable for use as an air freshener and as a fresh-air dispenser.

Examples 5–10 show possible modification of the inventive method to produce especially means to consume perspiration odours by adsorption and to cover up odours especially for use as an inner sole to be effective against athlete's foot or to be used as a stay-fresh device or a fresh-air dispenser in refrigerators or kitchen cupboards.

INDUSTRIAL APPLICABILITY

It is thus evident that the inventive method and the product produced according to this different method have a far range of industrial applicability.

I claim:

1. In a method of producing a sorptive body for use in filtering air and/or in eliminating odors, providing air freshening, and the like, in which finely ground solid particles of a sorptive substance or a composition containing a sorptive substance are mixed with a binding agent and are thereby bound into a cohesive body, the improvement comprising:

combining said finely ground solid particles with at least one liquid sorbate before mixing said solid particles with a binding agent, said solid particles having pores and capillaries for absorbing said sorbate, said sorbate being absorbable in said pores and capillaries, and the conditions of said combining being such that said sorbate is absorbed in said capillaries and pores;

mixing said combined solid particles and absorbed sorbate with a binding agent comprising a settable binder composition in a liquid solvent, said binder composition being settable upon evaporation of said liquid solvent at a temperature higher than the boiling point of said sorbate so as to bind said solid particles together as a cohesive sorptive body;

shaping said mixture and/or applying said mixture to a carrier body so as to form a cohesive sorptive body for use in filtering air and/or in eliminating odors, providing air freshening and the like; and, applying heat to said shaped and/or supported mixture so as to cause evaporation of said liquid solvent from said mixture, setting of said binder composition so as to bind said solid particles together in said cohesive sorptive body, and expulsion of said sorbate from said solid particles during the setting of said binder composition, the amount of said binder composition not exceeding 30% of the weight of said sorptive substance and the amount of said sorbate expelled from said solid particles during setting of said binder composition providing a connected open system of pores and capillaries in said binder composition for passage of air through said cohesive body and contact of said air with said sorptive substance.

2. A method according to claim 1, characterized by supporting said mixture on a carrier by coating or impregnating a porous carrier material with the mixture of claim 1 prior to the application of heat.

3. A method according to claim 2, characterized by the use of a porous synthetic foam, fleece-like substance, or woven or spun fabric as said carrier material.

4. A method of producing a sorptive body according to claim 1, characterized by the use of at least one of the following adsorptive materials as a sorptive substance: active carbon, silica gel, a molecular sieve, bentonite, perlite, pumice stone, infusion earth, powdered foam material, capillary-active fibrous material.

5. A method according to claim 4, characterized by the use of hydrocarbon, of an alcohol (e.g. ethyl, methyl, propyl alcohol), an ester, an ketone, chlorinated hydrocarbon, fluorocarbons as a sorbate.

6. A method according to claim 5, characterized by the use of the solvent in the binding agent as a sorbate.

7. A method according to claim 6, characterized by the use of a synthetic adhesive, e.g. a polyurethane adhesive.

8. A method according to claim 1, characterized by the addition of a sorbate with a low boiling point to a part of the finely-ground solid and of at least one sorbate with a relatively higher boiling point to another part of the ground solid component; after mixture with a binding material the two parts are subjected to heat treatment at a temperature between the boiling points of the two sorbates.

9. A method according to claim 8, characterized by the use of an etherial oil as a sorbate with a higher boiling point, e.g. perfume oil, or a solvent containing a dissolved scent.

10. A method according to claim 8, characterized by the use of an biocide substance (e.g. alkyldimethyl-amoniumchloride) as the sorbate with the higher boiling point or a solvent containing such a substance.

11. A method according to claim 8, characterized by the same finely-ground solid component, e.g. active carbon, being used to take up both sorbates.

12. A method according to claim 8, characterized by the higher-boiling sorbate being taken up into an expanded or foamed hollow-particled porous granular material such as perlite.

13. A method according to claim 8, characterized by the addition of a substance which provides adhesion, e.g. the tensides nonylphenol-polyglyco-ether or polyethylene glycol, to the sorbate with the higher boiling temperature.

14. A method according to claim 1, characterized by heat being applied before the binding agent is fully set.

15. A method according to claim 13, characterized by the application of heat to a temperature at least between 132° F. and 152° F. higher than the boiling point of the sorbate which is to be expelled.

16. A method according to claim 1 in which the amount of the sorbate, in percentage-weight terms, is at least approximately equal to the amount of finely ground solid component into which it is adsorbed, and in which the weight of the binding agent is between 5 and 30% of the weight of the finely ground sorptive substance.

17. A method according to claim 16 in which the weight of the binding agent is between 5 and 15% of the weight of the finely ground sorptive substance.

18. The product made by the method of claim 1 to produce a filter mat and/or an air purifier, especially in kitchen extractor-hoods, air-conditioning devices, wherein the granular sorptive body, e.g. active carbon, taken up in the binding agent is fastened to a carrier (11, 14), e.g. a fibrous fleece, foam strip.

19. A product made by the method of claim 11, wherein the granular sorptive substance, e.g. active carbon, is taken up in the binding agent is fastened to a carrier, e.g. a fibrous fleece or foam cut-out and wherein a part of the sorptive substance is impregnated with an aromatic agent with a high boiling point, e.g. perfume oil, the product being used as inner sole of a shoe or as an air freshener especially in kitchen extractor-hoods and air-conditioning devices.

20. A product according to claim 19 made by the additional method step of the addition of a substance which provides adhesion to the sorbate with the higher boiling temperature.

21. The product made by the method of claim 10, wherein a part of the higher-boiling sorbate containing a biocide substance, e.g. alkyldimethyl ammonium chloride or a solvent containing such a substance.

* * * * *